United States Patent [19]

Watanabe

[11] Patent Number: 4,695,897
[45] Date of Patent: Sep. 22, 1987

[54] IMAGE BUILDING APPARATUS
[75] Inventor: Junji Watanabe, Yokohama, Japan
[73] Assignee: Kabushiki Kaisha Toshiba, Kawasaki, Japan
[21] Appl. No.: 795,921
[22] Filed: Nov. 7, 1985
[30] Foreign Application Priority Data
　　Nov. 7, 1984 [JP]　Japan .................. 59-234623
[51] Int. Cl.$^4$ .................. H04N 1/21; G03G 15/00; G01D 15/10
[52] U.S. Cl. .................. 358/296; 346/76 PH; 355/3 R; 358/300; 358/302
[58] Field of Search .................. 358/296, 302, 300; 346/76 PH; 355/3 R, 14 R

[56] References Cited
FOREIGN PATENT DOCUMENTS
2130837　6/1984　United Kingdom ............ 358/296

Primary Examiner—Clifford C. Shaw
Assistant Examiner—Linda M. Peco
Attorney, Agent, or Firm—Finnegan, Henderson, Farabow, Garrett & Dunner

[57] ABSTRACT

An image building apparatus of the type including a scanner section for reading image information of an original placed on the original holding board by scanning it during movement thereof and a printer section for building an image on printing paper by activating the recording head in response to image information transmitted from the scanning section. Arrangement is made in accordance with the order of the scanner section and printer section as seen from the fore side of the apparatus. The scanner section moves in the transverse direction as seen from the fore part of the apparatus, whereas printing paper in the printer section is transported in the direction at a right angle relative to the movement of the scanner section.

23 Claims, 10 Drawing Figures

IMAGE BUILDING APPARATUS

BACKGROUND OF THE INVENTION

1. Field of the Invention

The present invention relates to an image building apparatus of the type including a scanner section for reading image information of an original and a printer section for building an image on printing medium, and more particularly to improvement of or relating to an image building apparatus of the above-mentioned type which assures reduced height of the housing and improved maneuverability of the apparatus.

2. Description of the Prior Art

A conventional image building apparatus with a scanner incorporated therein is so constructed that an image of an original is read in the scanning section by a scanning operation and thereafter the corresponding image is built on printing medium by activating a recording head in the printer section in response to the read image information.

However, in the case where the conventional image building apparatus of the above-mentioned type is constructed such that the scanner section includes an original holding board for holding an original thereon, a movable carriage with light source, mirror and other components mounted thereon, a CCD image sensor serving as photoelectric converting element and so on, it is usually required that the scanner section and the printer section be arranged in the transverse direction or in the vertical direction as seen from the fore side of the apparatus. This leads to increased height and weight dimensions of the apparatus. In some case it is found that the direction of movement of a carriage in the scanner section as well as the direction of transportation of printing paper in the printer section are different from those of conventional electronic photographic copying machine or printing apparatus, resulting in failure of smooth operation as expected.

SUMMARY OF THE INVENTION

Hence, the present invention has been made with the foregoing background in mind and its object resides in providing an image building apparatus which is designed with smaller dimensions particularly in height of the housing; It is another object of the invention to assure improved maneuverability by making the direction of scanning of the scanner section the same as the direction of scanning of a conventional electronic copying machine and further determining the direction of transportation of paper in the printer section same as the direction of transportation of paper in the printer section of a conventional typewriter, word processor or the like.

To accomplish the above object, there is proposed according to the invention an improved image building apparatus of the above type, wherein the arrangement is made in accordance with the order of the scanner section and the printer section as seen from the fore side of the housing of the apparatus and that movement of the scanner section is carried out in the transverse direction as seen from the fore side of the apparatus while transportation of printing medium in the printer section is carried out at a right angle relative to the direction of scanning of the scanner section.

This arrangement assures that the housing of the apparatus is designed in smaller dimensions particularly in height. Since the direction of scanning is made the same as the direction of scanning in the conventional electronic copying machine, there is no fear of making a mistake with respect to the direction of setting of an original. Moreover, since the direction of setting of printing medium is determined same as the direction of setting of printing medium in a conventional printer, setting of printing medium can be carried out easily.

Other objects, features and advantages of the invention will become readily apparent from reading of the following description which has been prepared in conjunction with the accompanying drawings.

BRIEF DESCRIPTION OF THE DRAWINGS

The accompanying drawings will be briefly described below.

DESCRIPTION OF THE PREFERRED EMBODIMENT

Now, the present invention will be described in a greater detail with reference to the accompanying drawings which schematically illustrate an image building apparatus in accordance with an embodiment of the invention.

Figure 1:
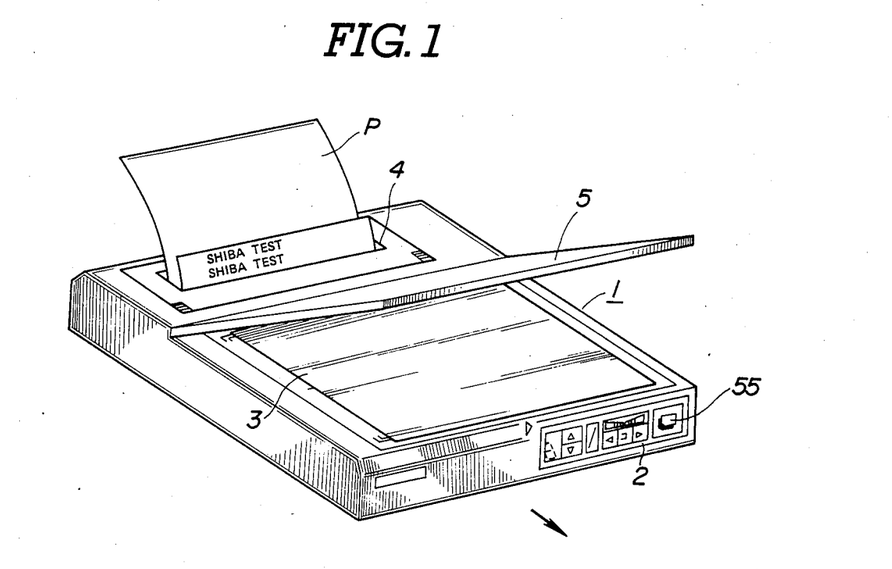
FIG. 1 is a perspective view of an image building apparatus in accordance with an embodiment of the invention, illustrating the geometrical configuration of the apparatus.

FIG. 1 is a perspective view of the apparatus illustrating the whole geometrical configuration thereof. The housing 1 of the apparatus is provided with a control panel 2 serving as a controlling section on the fore wall, an original holding board 3 on the upper surface and a paper discharging section 4 at the rear end part thereof. The original holding board 3 is adapted to open and close by turning movement of an original cover 5.

Figure 2:
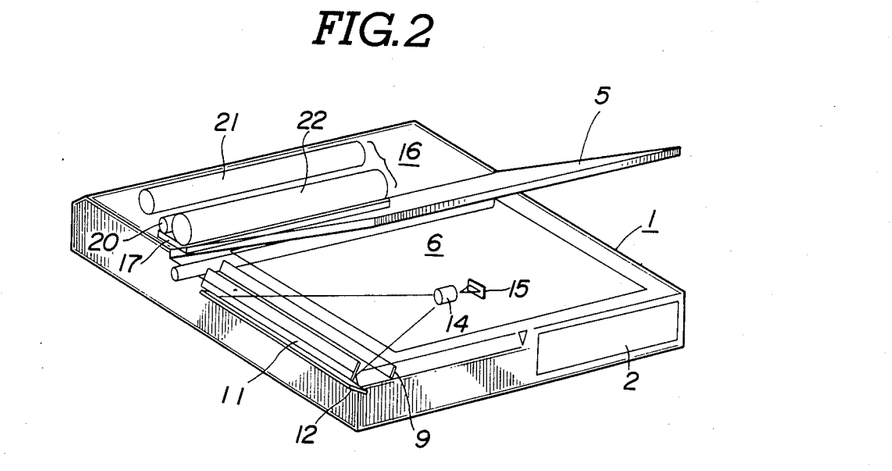
FIG. 2 is a perspective view of the apparatus in FIG. 1, particularly illustrating how the scanner section is arranged relative to the printer section.
Figure 3:
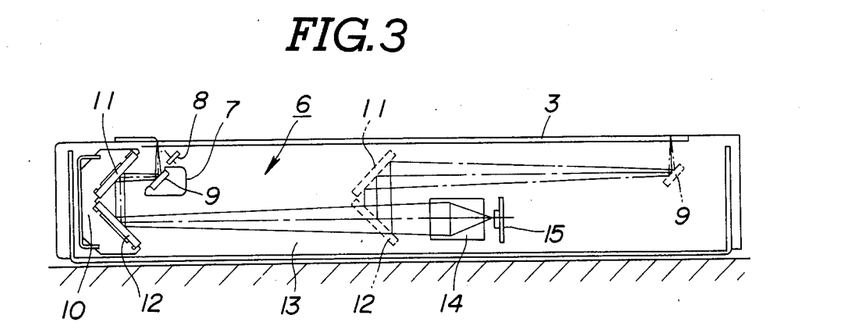
FIG. 3 is a sectional side view of the apparatus, particularly illustrating how the scanner portion is constructed.
Figure 4:
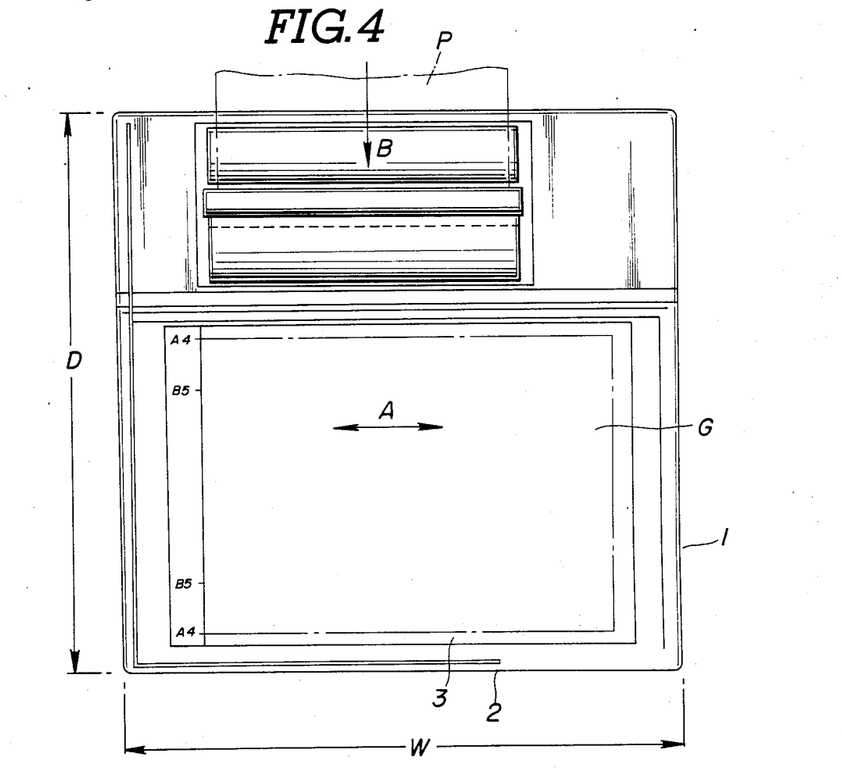
FIG. 4 is a plan view of the apparatus, particularly illustrating how the direction of scanning as well as the direction of transportation of printing medium are determined.

As shown in FIGS. 2 and 3, a scanner section 6 is arranged in the housing 1 at the position located below the original holding board 3. Referring to FIG. 3, a first carriage 7 includes a lamp 8 and a first mirror 9. A second carriage 10 includes a second mirror 11 and a third mirror 12. A lens 14 and a CCD image sensor 15 are disposed within the path of light beam 13 which is reflected from the third mirror 12. The second carriage 10 is adapted to move at a half speed relative to the speed of the first carriage 7 in order to assure that the length of the passage of light beam is kept constant. Both the first and second carriages 7 and 10 are adapted to move in parallel with the control panel 2 as represented by arrow marks A in FIG. 4 so that an original G is scanned.

Figure 6:
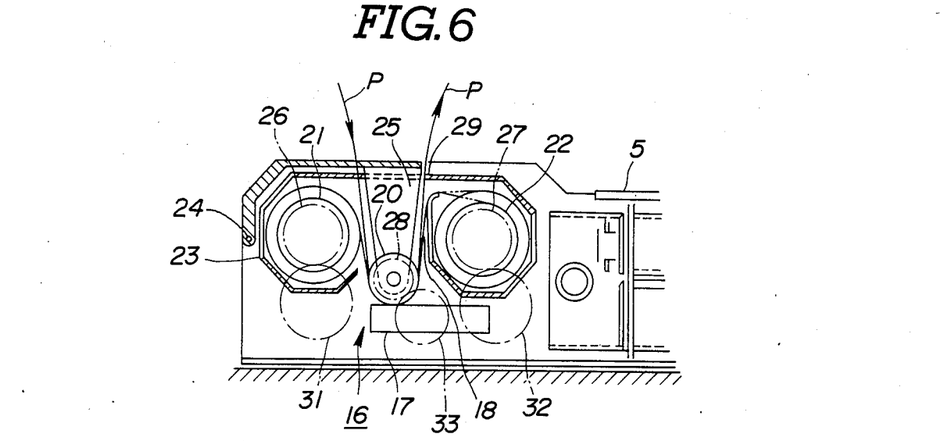
FIG. 6 is a fragmentary sectional side view of the apparatus, particularly illustrating the driving mechanism in FIG. 5.
Figure 7:
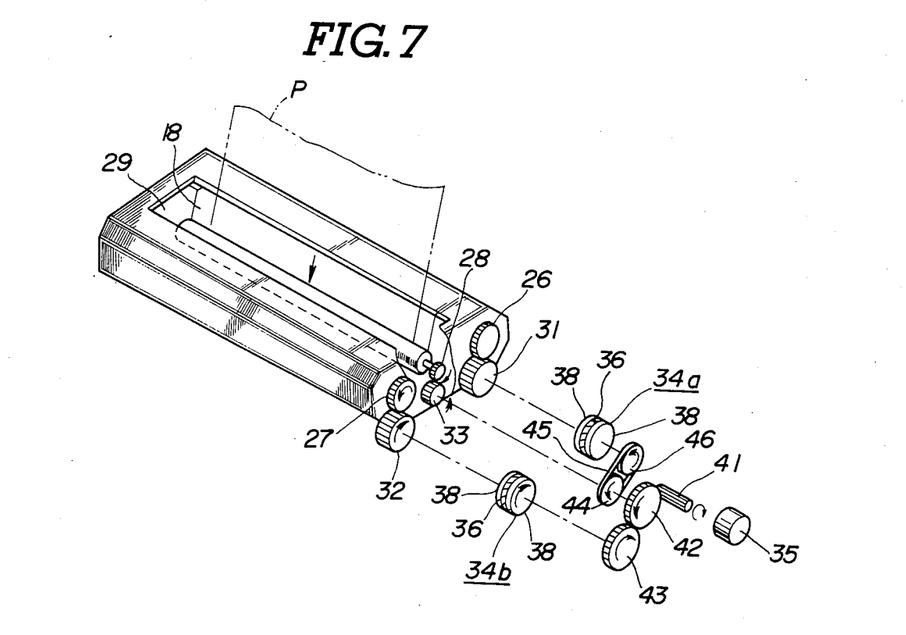
FIG. 7 is a fragmental perspective view of the apparatus, particularly illustrating the driving section for the printer section in the disassembled state.
Figure 8:
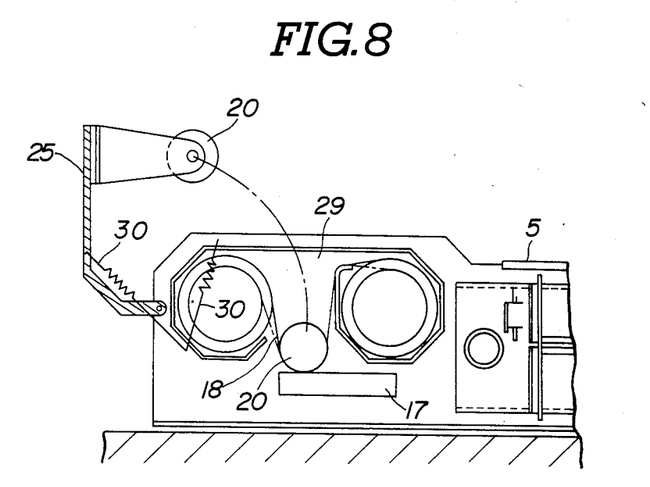
FIG. 8 is a fragmental sectional side view of the apparatus similar to FIG. 6, particularly illustrating how the cassette holder is turned away from the operative position.
Figure 9:
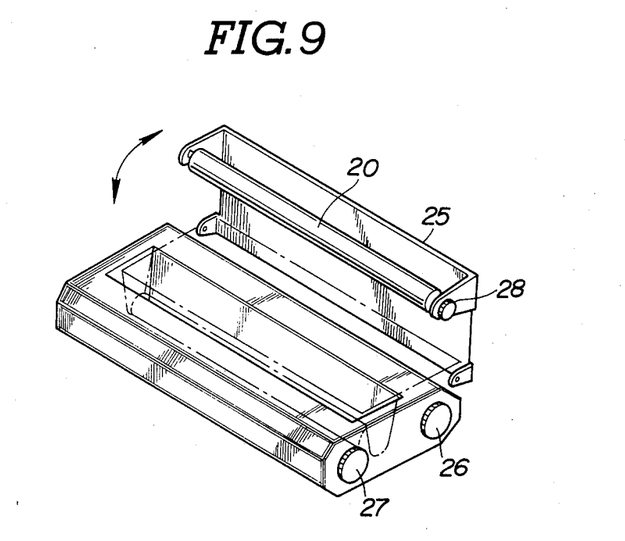
FIG. 9 is a fragmentary perspective view of the apparatus, particularly illustrating how the cassette holder is operated to assume the operative position as well as the inoperative position.

The image building apparatus is provided with a printer section 16 as shown in FIGS. 5 to 9 at the rear part thereof. A thermal head 17 which is brought in pressure contact with a platen 20 with an ink film 18 serving as ink donor medium and a paper P serving as printing medium interposed therebetween. The paper P is displaced as the platen 20 rotates. As represented by an arrow mark B in FIG. 4 the direction of transportation of the paper P is at a right angle relative to the direction of scanning (as represented by arrow marks A). Both the ends of the ink film 18 are wound about cores 21 and 22 which are replaceably accommodated in a cassette 23. Because the platen 20 is located between both the cores 21 and 22, it is assured that the effective height of the housing 1 is as low as possible. The platen 20 is rotatably supported by means of a holder 25 which is adapted to turn about a pivotal shaft 24. Thus, by turning the holder 25 in the clockwise direction as seen in FIG. 8, the platen 20 comes in contact with the heating surface of the thermal head 17 through an opening window 29 which is formed on the upper surface of the cassette 23. When the holder 25 is turned in the opposite direction, the platen 20 is displaced away from the heating surface of the thermal head 17. As is apparent from the drawing, the holder 25 is adapted to turn under the effect of resilient force of springs 30. Due to the toggle arrangement between springs 30, holder 25 and shaft 24, as illustrated, the platen 20 can assume two stable operative situations, one of them being such that it comes in pressure contact with the heating surface of the thermal head 17 with the ink film 18 interposed therebetween and the other one being such that it is displaced away from the thermal head 17 and thereby the ribbon cassette 23 can be replaced with another one. Thus, when the platen 20 carries out turning movement to come in pressure contact with the thermal head 17, the ink film 18 moves toward the thermal head 17 together with the platen 20 through the window 29 on the cassette 23.

The cores 21 and 22 are equipped with gears 26 and 27 at their one ends, whereas the platen 20 is equipped with a platen gear 28 at its one end. As rotational force is transmitted to the cores 21 and 22 and the platen 20 via the gears 26, 27 and 28, the ink film 28 and the paper P (printing medium) interposed between the former and the platen 20 are transported.

As long as the ink film 18 is removed from the housing 1, it is linearly stretched between both the cores 21 and 22. On the other hand, when the ink film 18 is fitted toward the operative position, it assumes the substantially U-shaped configuration under the influence of the platen 20 as the latter is brought in pressure contact with the thermal head 17, as shown in FIGS. 7 and 8.

Figure 5:
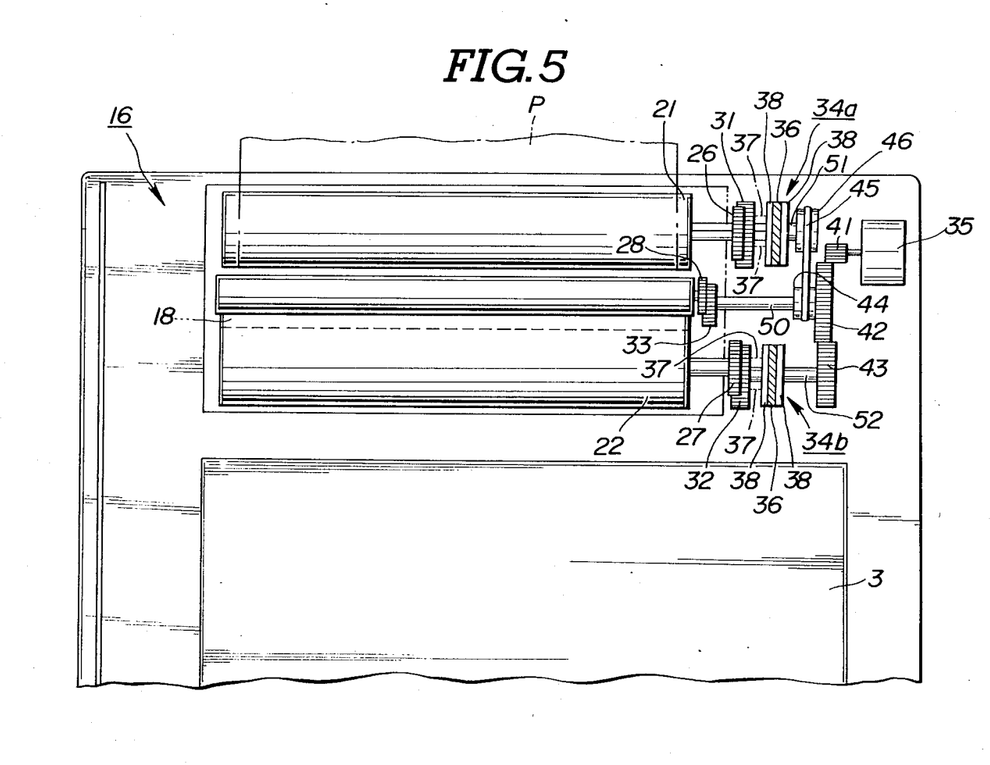
FIG. 5 is a fragmentary sectional plan view of the apparatus, particularly illustrating how the driving mechanism is constructed for the printer section.

Further, as shown in FIGS. 5 to 7, the gears 26, 27 and 28 on the ribbon cassette 23 come in meshing engagement with gears 31, 32 and 33 on the housing 1, when the ribbon cassette 23 is fitted to the operative position. A motor 35 includes a gear 41 which in turn meshes with a gear 42 on the first transmission shaft 50. The gear 33 which meshes with the gear 28 of the platen 20 is fixedly mounted on the first transmission shaft 50 whereby rotational force of the motor 35 is transmitted to the platen 20. Further, a pulley 44 is fixedly mounted on the first transmission shaft 50 and a pulley 46 is fixedly mounted on the second transmission shaft 51 so that an endless belt 45 is spanned between both the pulleys 44 and 46. The gear 42 on the first transmission shaft 50 meshes with a gear 43 which is fixedly mounted on the third transmission shaft 52. The second and third transmission shafts 51 and 52 are equipped with frictional clutches 34a and 34b. Each of the frictional clutches 34a and 34b comprises a frictional plate 36 made of felt, a pair of circular plates 38 with the frictional plate 36 clamped therebetween and a spring 37 adapted to thrust the circular plate 38 on the ribbon cassette side toward the frictional plate 36 whereby rotational force is transmitted from the motor 35 to the second and third transmission shafts 51 and 52 via the frictional clutches 34a and 34b. Further, since the gears 31 and 32 which mesh with the gears 26 and 27 of the cores 21 and 22 are fixedly mounted on the second and third transmission shafts 51 and 52, rotational force is transmitted from the motor 35 to the cores 21 and 22 via the gears 26, 27, 31 and 32.

To assure that the ink film 18 is stretched between both the cores 21 and 22 under the influence of a predetermined intensity of tension it is required that the core 21 on the unwinding side is subjected to force which is effective in the opposite direction (in the clockwise direction) to the direction of rotation of the core 22 on the winding side (in the anticlockwise direction) in the illustrated embodiment. To meet the requirement the core 21 on the unwinding side is practically rotated in such a manner as to follow rotation of the core 22 on the winding side due to difference in frictional force of the frictional clutches 34a and 34b or the like factor. As a result, the frictional clutch 34a is rotated in the same direction (in the anticlockwise direction) as the direction of rotation of the core 22 on the winding side while slippage takes place with the frictional clutch 34a.

Figure 10:
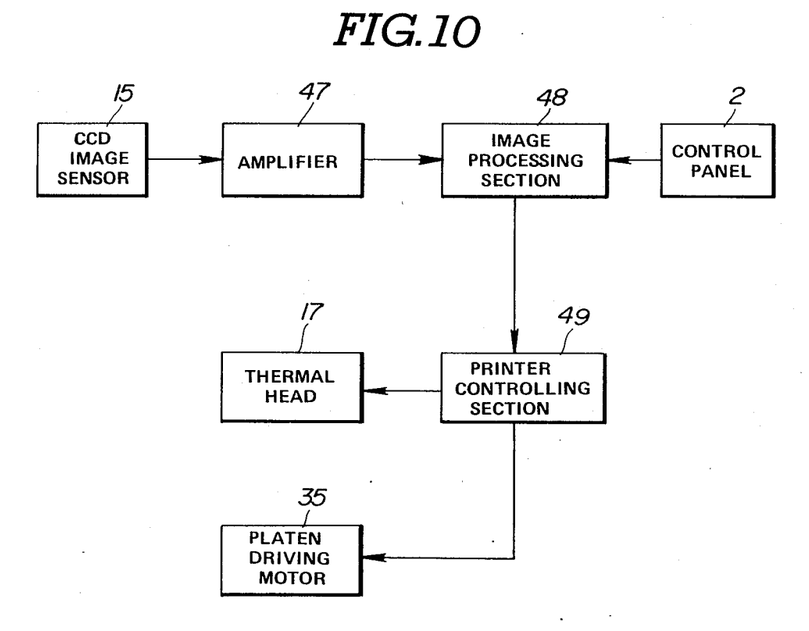
FIG. 10 is a block diagram of a controlling system for the apparatus.

As shown in FIG. 10, the CCD sensor 15 in the scanner section 6 is electrically connected to an image processing section 48 via an amplifier 47 and the image processing section 48 in turn is electrically connected to the thermal head 17 and the platen driving motor 35 in the printer section 16 via a printer controlling section 49 whereby the thermal head 17 and the platen driving motor 35 are activated in response to image informations.

Next, operation of the image building apparatus of the invention will be described below.

Prior to starting printing operation, an original G is placed on the original holding board 3 and then an operator depresses a printing button 55. Thereafter, the first and second carriages 4 and 10 in the scanner section 6 are displaced to scan the original G by light beam emitted from the lamp 8 and reflected light beam is then received by the CCD sensor 15 via the first to third mirrors 9, 11 and 12 and the lens 14 so that an image on the original G is read. Thus obtained image information is transmitted to the image processing section 48 via the amplifier 47 so as to activate the printer controlling section 49. Thus, the thermal head 17 and the platen driving motor 35 are activated and ink on the ink film 18 is transferred onto printing paper P by heat from the thermal head 17 in response to image information to build an required image thereon. At the same time printing paper P is transportated by the rotation of the platen 20.

According to a preferred embodiment of the invention the scanner section 6 and the printer section 16, as seen from the controlling panel 2, are arranged so that scanning is carried out in the transverse direction along the controlling panel 2 and transportation of printing paper P is carried out in the direction at a right angle relative to the direction of scanning. As is apparent from FIG. 4, dimensions W×D of the housing 1 for the image building apparatus can be reduced substantially.

It should be noted that the direction of scanning is the same as that of conventional electronic copying machines and therefore misoperation is unlikely to take place with respect to the direction of setting of an original G.

Further, since the direction of setting of printing paper P is the same as that of conventional printers, it is assured that setting of paper P is carried out smoothly.

Another advantageous feature of the invention is that the height of the housing 1 can be designed lower because the platen 20 is disposed in the space as defined between both the cores 21 and 22.

It should of course be understood that the present invention should not be limited only to the illustrated embodiment but various changes or modifications may be made in any acceptable manner without departure from the spirit and scope of the invention. For instance, the mechanism for displacing the platen 20 in contact with the thermal head 17 or away from the latter should not be limited only to the combination of the holder 25 and the springs 30 which exhibit a toggle function. Any other mechanism may be employed, provided that it functions properly as intended. Further, the mechanism for rotating the cores 21 and 22 and the platen 20 should not be limited to those as shown in FIGS. 5 and 7. Further, the structure of the scanner section should not be limited only to those as shown in FIGS. 2 and 3. Any other structure may be employed, provided that it is designed in such a manner that an original is held immovably but scanning is effected while light beam source, lens, mirrors and other components are displaced.

In the above-described embodiment, paper is fed into the apparatus at the upper rear part of the apparatus and it is then transported while following a substantially U-shaped track until it is discharged therefrom above the upper surface thereof at the position located in front of the feeding area. Alternatively, the direction of transportation of paper may be reversed to that in the foregoing embodiment.

Further, in the above-described embodiment the printer section is constructed in the form of a thermal transfer type heat sensitive printer. However, the present invention should not be limited only to this but the printer section may comprise a direct heating type printer using diago sensitized paper or the like, an ink jet type printer, a wire-dot type printer, an electrostatic printing type printer or the like.

What is claimed is:

1. An apparatus for forming an image of an original on a printing medium, comprising:
    a housing having a front forward portion and a top upper portion;
    an original holding board on the top upper portion of said housing for holding the original thereon;
    scanning means disposed below said original holding board, said scanning means for moving in a transverse direction as seen from the front of said housing to scan the original on the original holding board to read image information off the original, said scanning means including,
    a first carriage including a lamp for emitting a light beam toward the original and a first mirror against which the light beam transmitted from the original is reflected, said first carriage being adapted to move along the original in a direction transverse to the front of said housing,
    a second carriage including second and third mirrors against which the light beam transmitted from the first mirror is reflected, said second carriage adapted to move parallel to the direction of movement of the first carriage, the speed of movement of said second carriage being half of the speed of movement of said first carriage,
    lens means disposed in the path of the light beam transmitted from the third mirror, and
    photoelectric converting means into which the light beam is introduced after passing through said lens means for outputting an electrical signal in response to the introduced light beam; and
    printing means disposed behind said scanning means as seen from the front of the housing, said printing means for forming an image on the printing medium by driving a recording head in response to the electrical signal transmitted from said photoelectric converting means, said printing medium being transported in a direction substantially perpendicular to the direction of movement of said scanning means.

2. An image forming apparatus as defined in claim 1, wherein said photoelectric converting means comprises a CCD line image sensor.

3. An image forming apparatus as defined in claim 1, wherein said housing has a front wall provided with a controlling panel section.

4. An apparatus for forming an image of an original on a printing medium, comprising:
    a housing having a front forward portion and a top upper portion;
    an original holding board on the top upper portion of said housing for holding the original thereon;
    scanning means disposed below said original holding board, said scanning means for moving in a transverse direction as seen from the front of said housing to scan the original on the original holding board to read image information off the original, said scanning means including,
    a first carriage including a lamp for emitting a light beam toward the original and a first mirror against which the light beam transmitted from the original is reflected, said first carriage being adapted to move along the original in a direction transverse to the front of said housing,
    a second carriage including second and third mirrors against which the light beam transmitted from the first mirror is reflected, said second carriage adapted to move parallel to the direction of movement of the first carriage,
    lens means disposed in the path of the light beam transmitted from the third mirror, and photoelectric converting means into which the light beam is introduced after passing through said lens means for outputting an electrical signal in response to the introduced light beam; and printing means disposed behind said scanning means as seen from the front of the housing, said printing means for forming an image on the printing medium by driving a recording head in response to image information transmitted from said scanning means, the printing medium being transported in a direction substantially perpendicular to the direction of movement of said scanning means, said printing means including, a recording head having a recording surface including a plurality of recording elements arranged in a line, said recording surface being oriented upwardly and the direction of the line of recording elements being substantially parallel with the direction of movement of said scanning means, an ink donor medium for abutting against the line of recording elements, a platen roller for transporting the ink donor medium and the printing medium when said mediums are interposed between said platen roller and said recording head, said platen roller having a central axis of rotation and a peripheral surface, a part of said peripheral surface being pressed against the line of recording elements, the direction of the axis of said platen roller being substantially parallel with the direction of movement of said scanning means, ink donor medium accommodating means including a pair of spaced cylindrical cores for spanning ink donor medium therebetween, said cores each having an axis aligned substantially parallel with the direction of movement of said scanning means, driving means for rotating said cores and said platen roller, and means for guiding the printing medium into the apparatus from the upper surface of the housing, the printing medium following a substantially U-shaped track until being discharged therefrom above the upper surface of said housing.

5. An image forming apparatus as defined in claim 4, wherein said pair of cores in the ink donor medium accommodating means are spaced away from one another and the platen roller is accommodated in the space defined between said cores.

6. An image forming apparatus as defined in claim 4, wherein said ink donor medium accommodating means is constructed in the form of a cassette that is removably fitted to the housing of the apparatus.

7. An image forming apparatus as defined in claim 6 further comprising a mechanism for displacing the platen roller in contact with and away from the recording surface of the recording head, wherein said cassette is formed with an opening window on an upper surface thereof through which the platen roller passes before said cassettee is removed and replaced with another cassettee while the platen roller is displaced away from the recording head.

8. An image forming apparatus as defined in claim 7, wherein said mechanism for displacing the platen roller comprises a holder having first and second opposite ends, said platen roller being rotatably mounted on said first end, said second end being pivotably supported on said cassette on an opposite side of one of said cores from said platen roller, said holder being rotatable about said second end thereof, and a spring for biasing said roller to selectively assume one of two stable states, one of said stable states being when the platen roller comes in contact with the recording surface of the recording head and the other of said stable states being when the platen roller is displaced away from the recording head during cassette replacement.

9. An image forming apparatus as defined in claim 4, wherein said driving means is so constructed that a certain intensity of rotational force is imparted to each of said cores in opposite directions for applying tension to the ink donor medium spanned between said cores in said ink donor medium accommodating means.

10. An image forming apparatus as defined in claim 4, wherein said ink donor medium is a thermally fusible sheet material and said recording head is a thermal head.

11. An image forming apparatus as defined in claim 4, wherein said ink donor medium is a thermally sublimable sheet material and said recording head is a thermal head.

12. An image forming apparatus as defined in claim 4, wherein said housing has a control panel section on a wall at the front forward portion of said housing.

13. An apparatus for forming an image of an original on a printing medium, comprising:

a housing having a front forward portion and a top upper portion;

an original holding board on the top upper portion of said housing for holding the original thereon;

scanning means disposed below said original holding board, said scanning means for moving in a transverse direction as seen from the front of said housing to scan the original on the original holding board to read image information off the original; and printing means disposed behind said scanning means as seen from the front of the housing, said printing means for forming an image on the printing medium by driving a recording head in response to image information transmitted from said scanning means, the printing medium being transported in a direction substantially perpendicular to the direction of movement of said scanning means, said printing means including, a recording head having a recording surface including a plurality of recording elements arranged in a line, said recording surface being oriented upwardly and the direction of the line of recording elements being substantially parallel with the direction of movement of said scanning means, an ink donor medium for abutting against the line of recording elements, a platen roller for transporting the ink donor medium and the printing medium when said mediums are interposed between said platen roller and said recording head, said platen roller having a central axis of rotation and a peripheral surface, a part of said peripheral surface being pressed against the line of recording elements, the direction of the axis of said platen roller being substantially parallel with the direction of movement of said scanning means, ink donor medium accommodating means including a pair of spaced cylindrical cores for spanning ink donor medium therebetween, said cores each having an axis aligned substantially parallel with the direction of movement of said scanning means, driving means for rotating said cores and said platen roller, and means for guiding the printing medium into the apparatus from the upper surface of the housing, the printing medium following a substantially U-shaped track until being discharged therefrom above the upper surface of said housing.

14. An image forming apparatus as defined in claim 13, wherein said pair of cores in the ink donor medium accommodating means are spaced away from one another and the platen roller is accommodated in the space defined between said cores.

15. An image forming apparatus as defined in claim 13, wherein said ink donor medium accommodating means is constructed in the form of a cassette that is removably fitted to the housing of the apparatus.

16. An image forming apparatus as defined in claim 15 further comprising a mechanism for displacing the platen roller in contact with and away from the recording surface of the recording head, wherein said cassette is formed with an opening window on an upper surface thereof through which the platen roller passes before said cassette is removed and replaced with another cassette while the platen roller is displaced away from the recording head.

17. An image forming apparatus as defined in claim 16, wherein said mechanism for displacing the platen roller comprises a holder having first and second opposite ends, said platen roller being rotatably mounted on said first end, said second end being pivotably supported on said cassette on an opposite side of one of said cores from said platen roller, said holder being rotatable about said second end thereof, and a spring for biasing said holder to selectively assume one of two stable states, one of said stable states being when the platen roller presses against a recording surface of the recording head and the other of said stable states being when the platen roller is displaced away from the recording head during cassette replacement.

18. An image building apparatus as defined in claim 13, wherein said driving means is so constructed that a certain intensity of rotational force is imparted to each of said cores in opposite directions for applying tension to the ink donor medium spanned between said cores in said ink donor medium accommodating means.

19. An image forming apparatus as defined in claim 13, wherein said ink donor medium is a thermally fusible sheet material and said recording head is a thermal head.

20. An image forming apparatus as defined in claim 13, wherein said ink donor medium is a thermally sublimable sheet material and said recording head is a thermal head.

21. An image forming apparatus as defined in claim 13, wherein said housing has a front wall provided with a controlling panel section.

22. An apparatus for forming an image of an original on a printing medium, comprising:

a housing having a front forward portion and a top upper portion;

an original holding board on the top upper portion of said housing for holding the original thereon;

scanning means disposed below said original holding board, said scanning means including, a lamp for emitting a light beam toward the original, a photoelectric converting means into which the light beam is introduced for outputting an electrical signal in response to the introduced light beam, an optical system for introducing light reflected from the original into said photoelectric converting means, a carriage supporting said lamp and said optical system, said carriage adapted to move in a transverse direction as seen from the front of said housing to scan the original on the original holding board to read image information off the original; and printing means disposed behind said scanning means as seen from the front of the housing, said printing means for forming an image on the printing medium by activating a plurality of recording elements on a recording surface of a recording head in response to the electrical signal transmitted from said photoelectric converting means, the printing medium being transported in a direction substantially perpendicular to the direction of movement of said scanning means.

23. An apparatus for forming an image of an original on a printing medium, comprising:

a housing having a front forward portion and a top upper portion;

an original holding board on the top upper portion of said housing for holding the original thereon;

a scanner disposed below said original holding board, said scanner including a lamp and an optical reflecting system supported on a carriage, said carriage adapted to move in a transverse direction as seen from the front of said housing to scan the original on the original holding board;

a photoelectric converting means for receiving the image of the original from said optical system and for outputting an electrical signal in response to the introduced image;

a printer disposed behind said scanner as seen from the front of the housing, said printer including a plurality of recording elements on a recording surface of a recording head, said recording elements arranged in a line that is substantially parallel to the direction of movement of said carriage, said line of recording elements being activated in response to the electrical signal transmitted from said photoelectric converting means; and transporting means for transporting the printing medium over the line of recording elements, said transporting means transporting said printing medium in a direction substantially perpendicular to the direction of movement of said scanner.

* * * * *